US007580069B2

(12) United States Patent
Hoshuyama et al.

(10) Patent No.: US 7,580,069 B2
(45) Date of Patent: Aug. 25, 2009

(54) IMAGE-CAPTURING APPARATUS AND IMAGE PROCESSING APPARATUS

(75) Inventors: Hideo Hoshuyama, Kawasaki (JP); Keita Kimura, Tokyo (JP)

(73) Assignee: Nikon Corporation, Tokyo (JP)

( * ) Notice: Subject to any disclaimer, the term of this patent is extended or adjusted under 35 U.S.C. 154(b) by 815 days.

(21) Appl. No.: 10/844,417

(22) Filed: May 13, 2004

(65) Prior Publication Data

US 2005/0001910 A1 Jan. 6, 2005

(30) Foreign Application Priority Data

May 16, 2003 (JP) ............... 2003-138858

(51) Int. Cl.
*H04N 5/217* (2006.01)
*H04N 5/76* (2006.01)

(52) U.S. Cl. .................. 348/241; 348/231.99
(58) Field of Classification Search ........ None
See application file for complete search history.

(56) References Cited

U.S. PATENT DOCUMENTS

| 5,214,470 | A | * | 5/1993 | Denber ................ 355/75 |
| 6,014,170 | A | * | 1/2000 | Pont et al. ............ 348/231.4 |
| 6,272,259 | B1 | | 8/2001 | Mizoguchi |
| 6,661,456 | B1 | * | 12/2003 | Aufrichtig et al. ....... 348/247 |
| 6,940,550 | B2 | * | 9/2005 | Kitawaki et al. ......... 348/246 |
| 2002/0093577 | A1 | | 7/2002 | Kitawaki et al. |
| 2002/0181759 | A1 | | 12/2002 | Yamaguchi |
| 2004/0109601 | A1 | * | 6/2004 | Pang ................... 382/149 |
| 2004/0246505 | A1 | * | 12/2004 | Oh .................... 358/1.1 |

FOREIGN PATENT DOCUMENTS

| EP | 1 263 206 A2 | 12/2002 |
| JP | A 11-103413 | 4/1999 |
| JP | A-2002-209147 | 7/2002 |
| JP | A-2002-290831 | 10/2002 |
| WO | WO 00/62539 | 10/2000 |

* cited by examiner

*Primary Examiner*—Justin P Misleh
(74) *Attorney, Agent, or Firm*—Oliff & Berridge, PLC

(57) ABSTRACT

An image-capturing apparatus, includes: an image-capturing unit that captures an image of a subject through an optical system; and a control unit that outputs images captured at the image-capturing unit as image data files, and: the control unit outputs the image data files in a format that allows an image data file containing a normal image to be distinguished from an image data file containing a reference image to be used to correct an image defect in the normal image. An image processing apparatus, includes: an input unit to which an image data file output from the image-capturing apparatus is input; an identifying unit that identifies the image data file as a file containing the reference image or a file containing the normal image; and a correction unit that corrects an image defect in the image identified as the normal image based upon the image identified as the reference image.

8 Claims, 14 Drawing Sheets

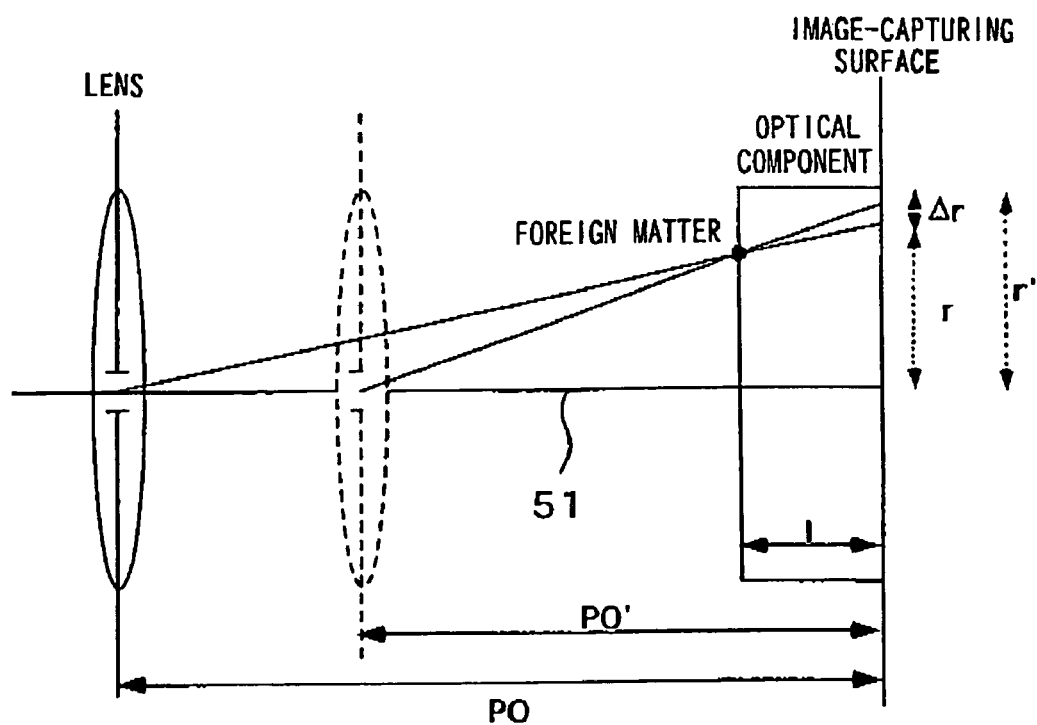
FIG.9A
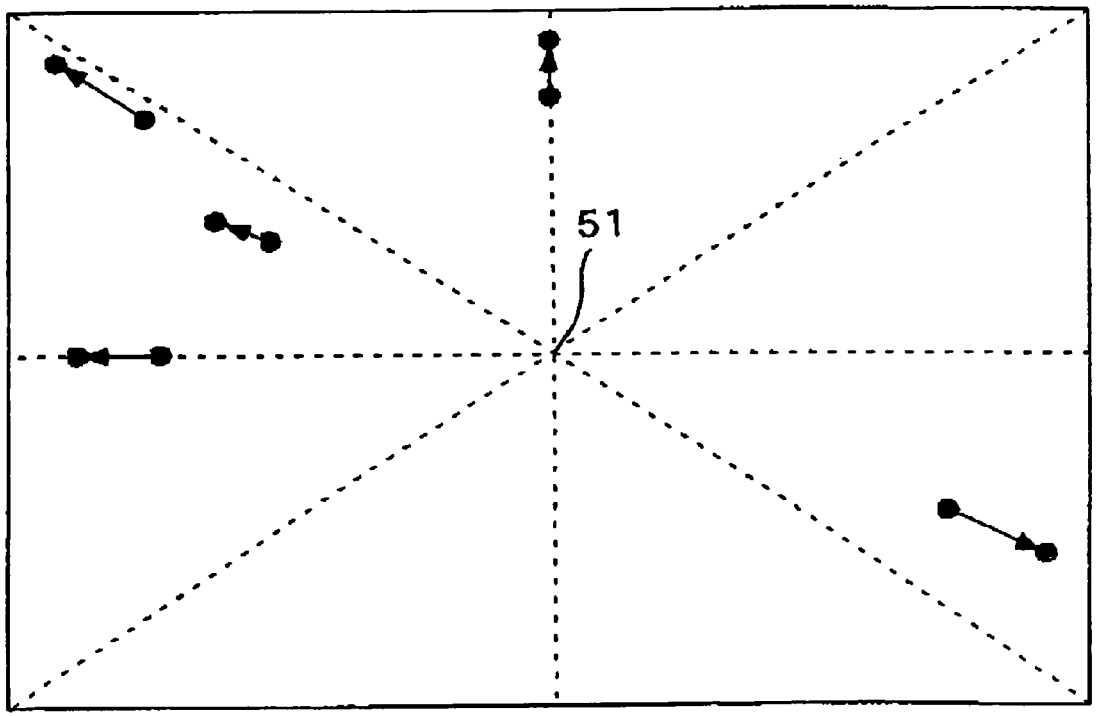
FIG.9B  BEFORE DISPLACEMENT: PUPIL POSITION PO
AFTER DISPLACEMENT: PUPIL POSITION PO'
WHEN PO > PO'

FIG.11

| APERTURE VALUE | FOREIGN MATTER DIAMETER r [pixel] | LPF SIZE | ONE-DIMENSIONAL FILTER COEFFICIENTS |
|---|---|---|---|
| F22 | 4.5 | DOES NOT REQUIRE CONVERSION PROCESSING | |
| F16 | 6.3 | 6x6 | [0.5, 1, 1, 1, 1, 1, 0.5]/6 |
| F11 | 9.1 | 9x9 | [1, 1, 1, 1, 1, 1, 1, 1, 1]/9 |
| F8 | 12.5 | 13x13 | [1, 1, 1, ......, 1, 1, 1]/13 |
| F5.6 | 17.9 | 18x18 | [0.5, 1, 1, ......, 1, 1, 0.5]/18 |
| F4 | 25.0 | 25x25 | [1, 1, 1, ......, 1, 1, 1]/25 |

FIG.12

| 0.25 | 0.5 | 0.5 | 0.5 | 0.5 | 0.5 | 0.25 |
|---|---|---|---|---|---|---|
| 0.5 | 1 | 1 | 1 | 1 | 1 | 0.5 |
| 0.5 | 1 | 1 | 1 | 1 | 1 | 0.5 |
| 0.5 | 1 | 1 | 1 | 1 | 1 | 0.5 |
| 0.5 | 1 | 1 | 1 | 1 | 1 | 0.5 |
| 0.5 | 1 | 1 | 1 | 1 | 1 | 0.5 |
| 0.25 | 0.5 | 0.5 | 0.5 | 0.5 | 0.5 | 0.25 |

/36

IMAGE-CAPTURING APPARATUS AND IMAGE PROCESSING APPARATUS

INCORPORATION BY REFERENCE

The disclosures of the following priority applications are herein incorporated by reference:

Japanese Patent Application No. 2002-138858 filed May 16, 2003; and

Japanese Patent Application No. 2003-307355 filed Aug. 29, 2003.

BACKGROUND OF THE INVENTION

1. Field of the Invention

The present invention relates to an image-capturing apparatus such as a digital camera and an image processing apparatus that processes an image captured by the image-capturing apparatus. More specifically, it relates to an image-capturing apparatus and an image processing apparatus to be utilized in conjunction with each other so as to output captured image data from the image-capturing apparatus to the image processing apparatus and eliminate image defects such as any adverse effect of foreign matter in the image-capturing optical path from the captured image at the image processing apparatus.

2. Description of Related Art

If foreign matter becomes adhered to an optical member such as an optical filter disposed in the image-capturing optical path near the image-capturing element in an image-capturing apparatus such as a digital camera, a shadow of the foreign matter adhered to the optical member appears in a captured image, causing an image defect. Foreign matter such as dirt or dust particles tends to enter an image-capturing apparatus in which interchangeable lenses are used particularly readily during a lens replacement. An image captured in such an image-capturing apparatus is thus more susceptible to a defect caused by foreign matter having entered the image-capturing apparatus and becoming adhered onto an optical member. This problem is addressed in an image correcting apparatus in the related art by correcting an image defect manifesting in a captured image based upon position information which is set to indicate the position of the image defect (Japanese Laid Open Patent Publication No. H11-103413).

SUMMARY OF THE INVENTION

It is necessary to set the image defect position information in the image correcting apparatus disclosed in Japanese Laid Open Patent Publication No. H 11-103413. This image correcting apparatus detects the image defect position information by using a captured image of a uniform plane in, for instance, white or black. If the lens of the image-capturing apparatus is repeatedly exchanged without removing foreign matter having entered the image-capturing apparatus, more foreign matter is allowed to enter the image-capturing apparatus and the image defect becomes worse. For this reason, it is desirable to detect the image defect position information to be set in the image correcting apparatus by using an image captured with timing as close as possible to the timing with which the correction target image is captured. However, in the image correcting apparatus in Japanese Laid Open Patent Publication No. H 11-103413, the image used to detect the image defect position information and the correction target image must be individually selected and specified, which is a time-consuming process.

According to the 1st aspect of the invention, an image-capturing apparatus comprises: an image-capturing unit that captures an image of a subject through an optical system; and a control unit that outputs images captured at the image-capturing unit as image data files, and: the control unit outputs the image data files in a format that allows an image data file containing a normal image to be distinguished from an image data file containing a reference image to be used to correct an image defect in the normal image.

According to the 2nd aspect of the invention, it is preferred that an image-capturing apparatus according to the 1st aspect of the invention further comprises: a mode setting unit that sets a reference image acquisition mode in which the reference image is to be obtained, and: the control unit designates an image captured by the image-capturing unit when the reference image acquisition mode is set as the reference image.

According to the 3rd aspect of the invention, it is preferred that in an image-capturing apparatus according to the 1st aspect of the invention, the control unit appends different extensions to the image data file containing the normal image and the image data file containing the reference image.

According to the 4th aspect of the invention, it is preferred that in an image-capturing apparatus according to the 1st aspect of the invention: the image data files are each constituted of image data corresponding to pixels in the image and information related to the image; and the control unit stores information with which the image data file containing the normal image and the image data file containing the reference image can be distinguished from each other in the information related to the image.

According to the 5th aspect of the invention, an image-capturing apparatus comprises: an image-capturing unit that captures a subject image input through an optical system; a mode switching unit that selects a first mode in which a reference image is captured by the image-capturing unit or a second mode in which a normal image is captured by the image-capturing unit; an output unit that outputs the reference image and the normal image captured by the image-capturing unit as image data files to an external apparatus; and an information appending unit that appends information indicating whether an image data file output by the output unit contains the reference image or the normal image to the image data file.

According to the 6th aspect of the invention, it is preferred that in an image-capturing apparatus according to the 5th aspect of the invention: the information appending unit appends metadata containing information indicating either the reference image or the normal image to the image data file; and the meta data do not alter the reference image or the normal image contained in the image data file.

According to the 7th aspect of the invention, it is preferred that in an image-capturing apparatus according to the 5th aspect of the invention: the information appending unit appends the information indicating whether the image data file contains the reference image or the normal image to the image data file by partially modifying a file name assigned to the image data file.

According to the 8th aspect of the invention, an image processing apparatus comprises: an input unit to which an image data file output from an image-capturing apparatus according to any one of the 1st aspect through the 4th aspect of the invention is input; an identifying unit that identifies the image data file as a file containing the reference image or a file containing the normal image; and a correction unit that corrects an image defect in the image identified as the normal image based upon the image identified as the reference image.

According to the 9th aspect of the invention, it is preferred that in an image processing apparatus according to the 8th aspect of the invention 8: the image data files are each constituted of image data corresponding to pixels in the image and information related to the image; and the correction unit selects a specific reference image to be used to correct an image defect in a given normal image based upon the information related to the image contained in the image data file of the reference image and the information related to the image contained in the image data file of the normal image.

According to the 10th aspect of the invention, an image processing apparatus, comprises: an input unit to which an image data file output from an image-capturing apparatus according to any one of the 5th aspect through the 7th aspect of the invention is input; an identifying unit that identifies the image data file as a file containing the reference image or a file containing the normal image based upon the information; and an elimination unit that eliminates an effect of foreign matter present on an image-capturing optical path at the image-capturing unit from the normal image based upon the reference image.

According to the 11th aspect of the invention, a computer-readable computer program product comprises: a control program that executes a function of an image processing apparatus according to any one of the 8th aspect through the 10th aspect of the invention.

BRIEF DESCRIPTION OF THE DRAWINGS

FIGS. 9A and 9B show the change in the foreign matter shadow position occurring as the pupil position changes.

FIG. 11 shows a table of the one-dimensional filter coefficients corresponding to the individual aperture values.

FIG. 12 shows the filter used to convert the transmittance map to a transmittance map corresponding to the aperture value F16, represented as a two-dimensional filter.

FIG. 14 shows how the program is provided in a recording medium such as a CD ROM or through a data signal on the internet or the like.

DESCRIPTION OF PREFERRED EMBODIMENTS (Structures of Electronic Camera and Personal Computer)

Figure 1:
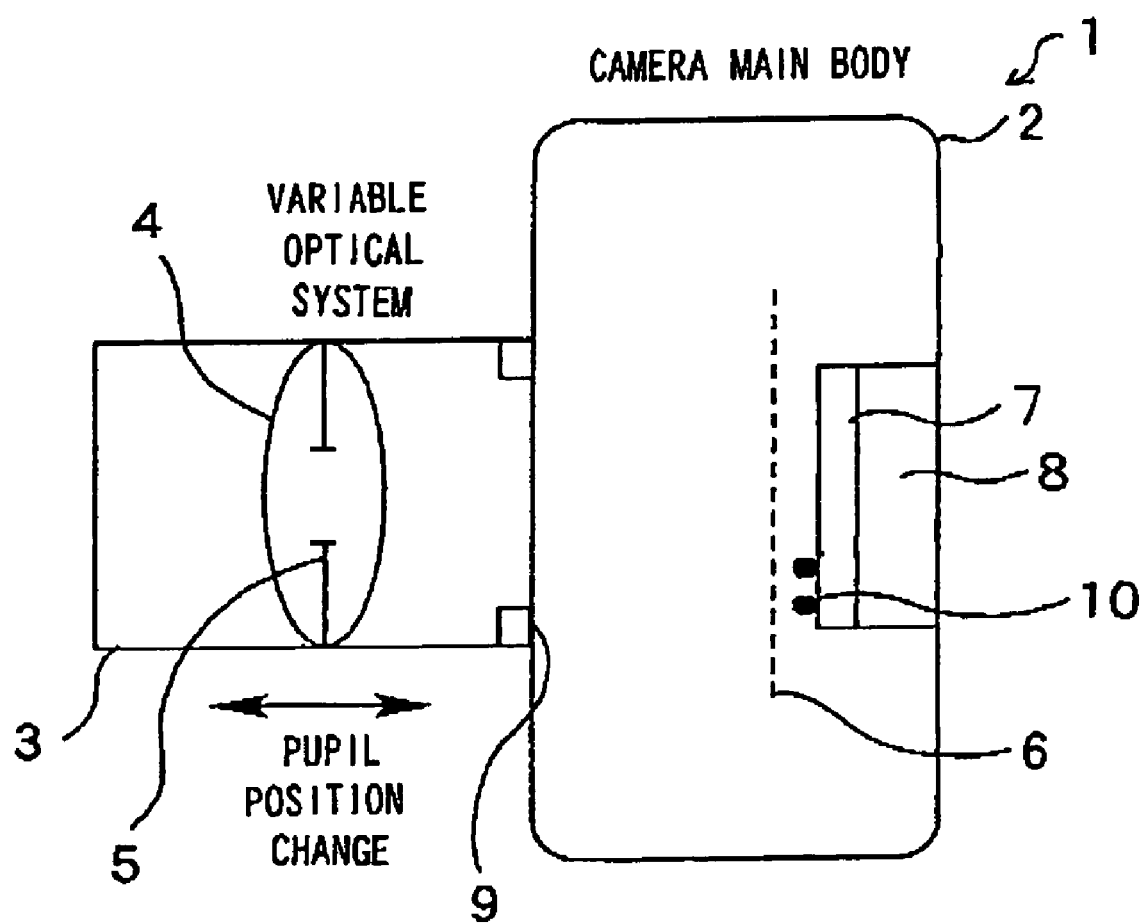
FIG. 1 shows the structure of an electronic camera in which interchangeable lenses are used.

FIG. 1 shows the structure of a single lens reflex electronic camera (hereafter referred to as an electronic camera) in which interchangeable lenses are used. The electronic camera 1 includes a camera main body 2 and a variable optical system 3 constituted of a mounted interchangeable lens. The variable optical system 3 includes a lens 4 and an aperture 5. While the lens 4 is constituted of a group of optical lenses, the figure shows a single representative lens and the position of the lens 4 is referred to as a main pupil position (hereafter simply referred to as a pupil position). The pupil position is represented by a value determined in conformance to the lens type and the zoom position of the zoom lens. The pupil position may also be affected by the focal length.

The camera main body 2 includes a shutter 6, an optical component 7 such as an optical filter or a cover glass and an image-capturing element (sensor) 8. The variable optical system 3 can be detachably mounted at a mount unit 9 of the camera main body 2. In addition, the variable optical system 3 transmits optical parameters such as information related to the pupil position and information related to the aperture value to a control unit 17 (see FIG. 2) of the electronic camera 1 via the mount unit 9. The aperture value may be selected within a range of, for instance, F2.8 to F22.

Reference numeral 10 indicates foreign matter having become adhered to the surface of the optical component 7 disposed to the front of the image-capturing element 8. Through testing conducted to evaluate changes occurring in the foreign matter shadow appearing in photographic images by altering the aperture value and the pupil position at the variable optical system 3, the following two findings were obtained.

(1) The size of the foreign matter shadow and the light transmittance change in correspondence to the aperture value.
(2) The position foreign matter shadow changes as the pupil position of the lens changes.

These two findings indicate that even when foreign matter remains at a fixed position, it appears to change in the photographic image each time the photographing conditions (the aperture value and the pupil position) set for the lens are altered. The adverse effect of foreign matter may be eliminated by adopting the method detailed below in conjunction with such a variable optical system.

Figure 2:
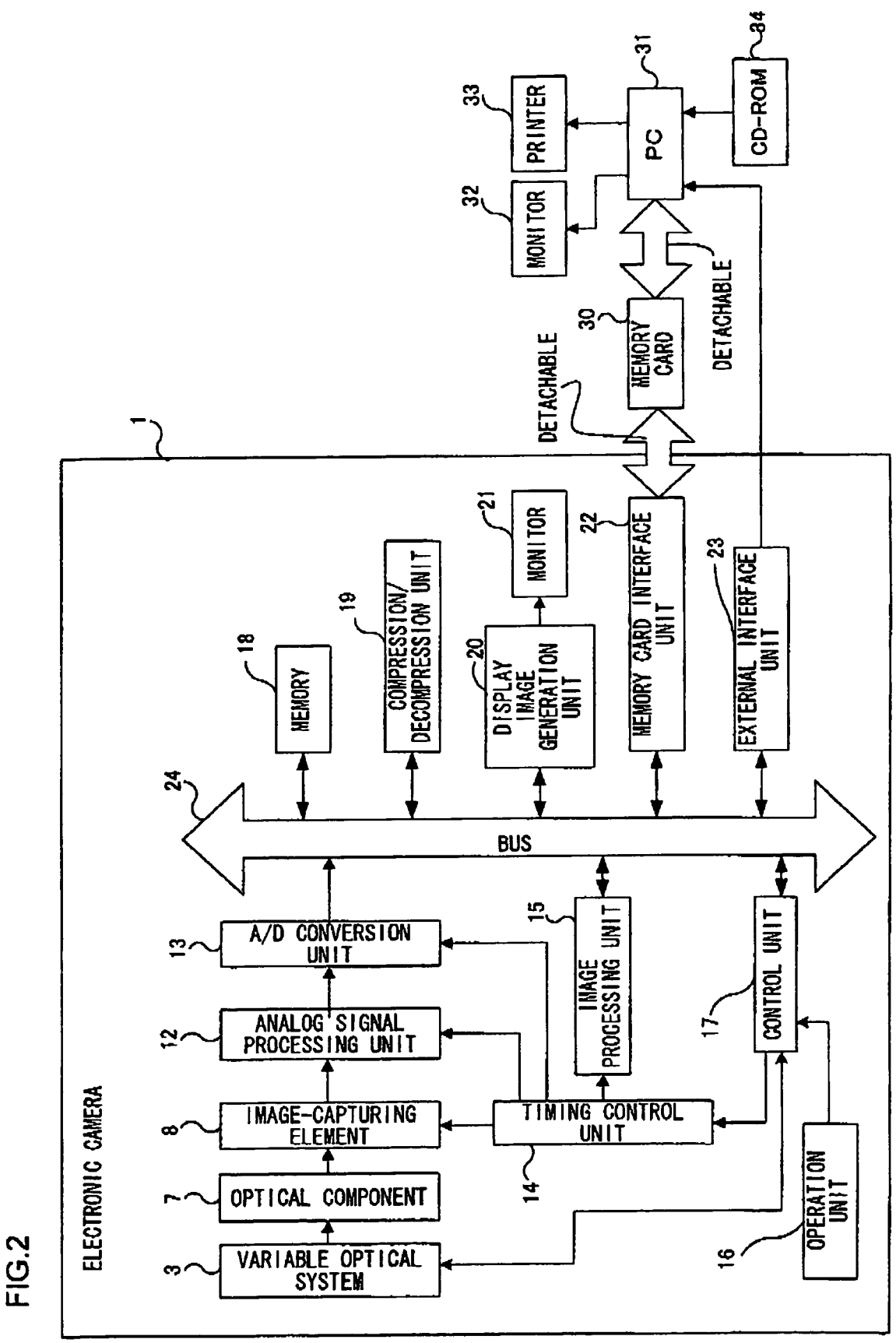
FIG. 2 shows a personal computer (PC) and its peripheral devices shown together with a block diagram of the electronic camera.

FIG. 2 shows a PC (personal computer) 31 and its peripheral devices in addition to a block diagram of the electronic camera 1. The PC 31, which functions as an image processing apparatus, executes the foreign matter effect elimination processing to be detailed later by using image data (image digital data) obtained from the electronic camera 1.

The electronic camera 1 includes the variable optical system 3, the optical component 7, the shutter 6 (not shown in FIG. 2), the image-capturing element 8, an analog signal processing unit 12, an A/D conversion unit 13, a timing control unit 14, an image processing unit 15, an operation unit 16, a control unit 17, a memory 18, a compression/decompression unit 19, a display image generation unit 20, a monitor 21, a memory card interface unit 22 and an external interface unit 23.

The image-capturing element 8 captures an image of a subject through the variable optical system 3 and outputs image signals (image-capturing signals) corresponding to the captured subject image. The image-capturing element 8 includes a rectangular image-capturing area constituted with a plurality of pixels and sequentially outputs the image signals, which are analog signals each corresponding to the electrical charge stored at one of the pixels, to the analog signal processing unit 12 in units of individual pixels. The image-capturing element 8 may be constituted of a single plate color CCD. The analog signal processing unit 12 includes an internal CDS (correlated double sampling) circuit, an internal AGC (auto gain control) circuit and the like and executes a specific type of analog processing on the image signals input thereto. The A/D conversion unit 13 converts the analog signals having undergone the processing at the analog signal processing unit 12 to digital signals. The timing control unit 14, which is controlled by the control unit 17, controls the timing with which various operations are executed by the image-capturing element 8, the analog signal processing unit 12, the A/D conversion unit 13 and the image processing unit 15.

The memory card interface unit 22 achieves interface with a memory card (a card-type removable memory) 30. The external interface unit 23 achieves interface with an external apparatus such as the PC 31 via a specific type of cable or wireless transmission line. The operation unit 16 is equivalent to a shutter release button, a mode selector button and the like. At the monitor 21, various menus, a subject image captured at the image-capturing element 8 and an image reproduced by using image data stored in the memory card are displayed. The output of the operation unit 16 is input to the control unit 17, whereas the output of the display image generation unit 20 is input to the monitor 21. The image processing unit 15 maybe constituted of, for instance, a single chip microprocessor dedicated to image processing.

The A/D conversion unit 13, the image processing unit 15, the control unit 17, the memory 18, the compression/decompression unit 19, the display image generation unit 20, the memory card interface unit 22 and the external interface unit 23 are connected with one another via a bus 24.

A monitor 32, a printer 33 and the like are connected to the PC 31, and an application program recorded in a CD ROM 34 is pre-installed at the PC 31. In addition, the PC 31 includes a memory card interface unit (not shown) that achieves interface with the memory card 30 and an external interface unit (not shown) that achieves interface with an external apparatus such as the electronic camera 1 via a specific type of cable or a wireless transmission line, as well as a CPU, a memory and a hard disk (not shown).

As the operator of the electronic camera 1 structured as shown in FIG. 1 selects a photographing mode and presses the shutter release button via the operation unit 16, the control unit 17 implements timing control for the image-capturing element 8, the analog signal processing unit 12 and the A/D conversion unit 13 via the timing control unit 14. The operator may select either a normal mode to photograph a normal subject or a foreign matter information acquisition mode (a reference image acquisition mode) to photograph a reference image, which is to be detailed later, in order to obtain foreign matter information, as the photographing mode. It is to be noted that the normal mode may include a plurality of sub-modes corresponding to various types of subjects.

The image-capturing element 8 generates image signals which correspond to an optical image formed in the image-capturing area by the variable optical system 3. These image signals undergo a specific type of analog signal processing at the analog signal processing unit 12 and are then output to the A/D conversion unit 13 as analog processed image signals.

The image signals having undergone the analog processing are digitized at the A/D conversion unit 13 which then provides the digitized image signals to the image processing unit 15 as image data.

It is assumed that in the electronic camera 1 achieved in the embodiment, the image-capturing element 8 is constituted of a typical single-plate color image-capturing element having R (red), G (green) and B (blue) color filters arranged in a Bayer array and that image data adopting the R G B colorimetric system are provided to the image processing unit 15. Each of the pixels. constituting the image data holds color information corresponding to one of the three color components, R, G and B. While each of the photoelectric conversion elements constituting the image-capturing element 8 is referred to as a pixel in this context, each unit of the image data corresponding to a pixel is also referred to as a pixel. In addition, an explanation is given based upon the concept that an image, too, is constituted of a plurality of pixels.

The image processing unit 15 executes image processing such as interpolation, gradation conversion and edge emphasis on such image data. The image data having undergone image processing then undergo a specific type of compression processing at the compression/decompression unit 19 as necessary, and are recorded into the memory card 30 via the memory card interface unit 22.

The image data having undergone the image processing are provided to the PC 31 via the memory card 30. The image data may be provided to the PC 31 via the external interface unit 23 and a specific type of cable or a wireless transmission line. It is assumed that the image data having undergone the image processing have been interpolated with color information corresponding to all three color components R, G and B present at each pixel.

(Foreign Matter Effect Elimination Processing)

Next, the processing executed to eliminate the undesirable effects of foreign matter from individual sets of photographic image data is explained. In the embodiment, a method whereby a reference image used to obtain foreign matter information is photographed and the foreign matter effect is eliminated from a plurality of images obtained under varying optical photographing conditions by using the reference image is adopted. However, the reference image is not constituted of completely uniform or homogeneous white reference data but instead is obtained by photographing a blue sky, an almost uniform wall surface, a gray chart, a solid color paper surface or the like. The reference data used for this purpose may contain information indicating peripheral darkening of the lens, the gradation of the subject and the shading at the image-capturing element and the like. The reference data should be the type of data available under conditions in which a photographing operation can be performed easily at a readily accessible location and do not need to be completely uniform since they are converted to uniform reference data by using an algorithm on the image processing side.

(Operation Executed on the Electronic Camera Side)

Before photographing an image, the user selects either photographing mode, i.e., the normal mode or the foreign matter information acquisition mode described earlier. The electronic camera 1 alters file information in the captured image data to be recorded into the memory card 30 in correspondence to the selected photographing mode.

Figure 3:
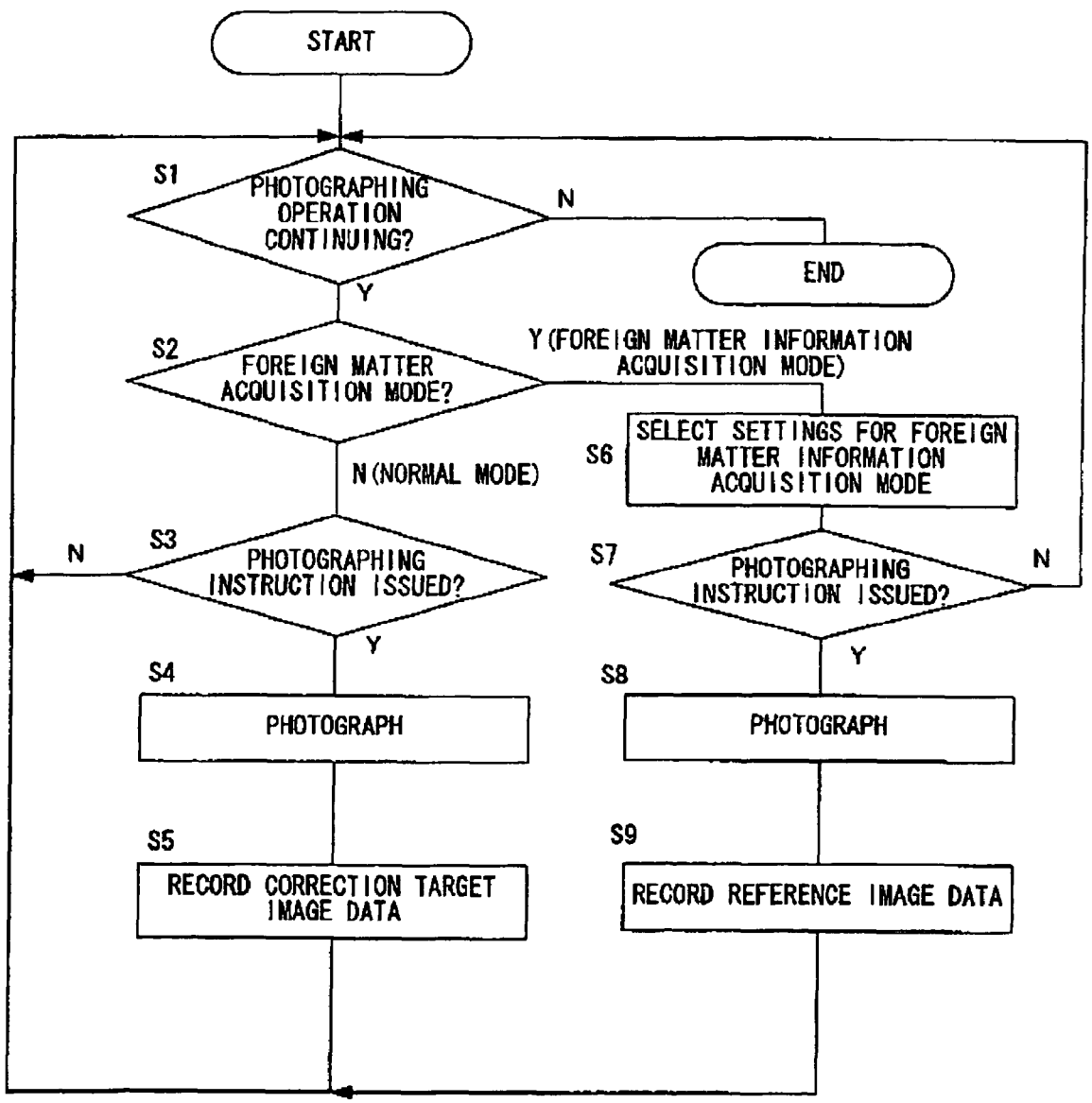
FIG. 3 shows a flowchart of the processing executed in the electronic camera during a photographing operation.

FIG. 3 presents a flowchart of the processing executed in the electronic camera 1 during a photographing operation. This processing is executed when the user selects either photographing mode as described above. In step S1 in FIG. 3, a decision is made as to whether or not an instruction to continue with a photographing operation has been issued. The processing in step S1 is executed so as to allow the processing in FIG. 3 to be terminated promptly once the user issues an instruction to end the photographing operation, except for during the execution of the photographing operation or while photographic image data are being recorded. If the user has issued an instruction to continue with the photographing operation, i.e., if either of the photographing modes has been selected as described earlier, the operation proceeds to step S2. Otherwise, i.e., if the user has not selected either of the photographing modes and has issued an instruction to end the photographing operation, the processing in FIG. 3 ends.

In step S3, a decision is made as to whether or not the selected photographing mode is the foreign matter information acquisition mode. If the foreign matter information acquisition mode is currently selected, the operation proceeds to step S6. In step S6, the photographing conditions (the aperture, the image processing details, etc.) under which a reference image is to be photographed as explained later, are set in the electronic camera 1. If the foreign matter information acquisition mode is not currently selected, i.e., if the normal mode is currently selected, the operation proceeds to step S3. At this time, the photographing conditions under which a subject is to be photographed in a normal manner are set in the electronic camera. The settings for the photographing conditions under which the normal photographing operation is to be executed may be pre-selected in correspondence to the type of subject, or the settings may be adjusted by the user.

The processing in steps S3 to S5 explained below is executed in the normal mode. In step S3, a decision is made as to whether or not a photographing instruction has been issued. If the user has issued a photographing instruction through an operation of the shutter release button or the like, the electronic camera 1 executes a photographing operation in the next step S4, and then the captured image data are recorded into the memory card 30 shown in FIG. 2 in step S5. The captured image data recorded in step S5 become a correction target of image correction processing executed by the PC 30, which is to be explained later. If it is decided in step S3 that no photographing instruction has been issued or after executing the processing in step S5, the operation returns to step S1.

A file name is set in the captured image data (correction target image data, normal image data) recorded into the memory card 30 in step 55. The file name contains an extension indicating the file type, and the portion following "." (dot) toward the end of the file name constitutes the extension. Specifically, the file name set for the correction target image data is presented as "<xx (name inherent to each file)>.<yy (extension)>". The "xx" portion is constituted of characters or symbols, whereas the "yy" portion is constituted of several alphabetic letters which are predetermined in correspondence to the file type.

In addition, tag information is attached onto the correction target image data. The tag information is metadata (data having written therein information on the base data and used in file information management) containing, for instance, information indicating the settings selected in the electronic camera 1 at the time of file generation and the date/time of the file generation. In other words, the tag information includes information related to the captured image. The tag information attached to the correction target image data does not affect the base image data. Namely, even if the tag information is modified, the correction target image data do not become altered. The image data correspond the individual pixels constituting the image.

In step S5, "JPG" is set for the extension of the file name and tag information indicating that the photographing operation was performed in the normal mode is attached. It is to be noted that the "JPG" set in the extension indicates that the image file was compressed by adopting the JPEG (Joint Photographic Experts Group) method, which is a widely used image data compression method. Namely, the compression/decompression unit 19 shown in FIG. 2 compresses the image data through the JPEG method. It is to be noted that a different extension may be used and that another method may be adopted to compress image data. As an alternative, the image data do not need to be compressed.

The processing in steps S6 through S9 explained below is executed in the foreign matter information acquisition mode. In step S6, the photographing conditions under which the reference image is to be photographed are set. In this embodiment, the photographing conditions such as the F value (aperture value) and image processing details are set as follows. It is to be noted that the specific terms used to refer to the individual settings are not limited to those used below, and any terms may be used as long as they refer to similar setting contents. In addition, other settings may be used as long as foreign matter information can be obtained through the processing to be explained later by using the photographic reference image data.

ISO sensitivity: 200
Edge emphasis: no
Gradation correction: Standard
Image quality mode: fine
Image size: L
F value: minimum aperture
Exposure correction: no After setting the photographing conditions in step S6, a decision is made in step S7 as to whether or not a photographing instruction has been issued. For this photographing operation, the user uses a uniform or homogeneous plane as the subject to obtain a reference image as explained earlier. In response to a photographing instruction issued by the user by operating the shutter release button or the like, the electronic camera 1 executes a photographing operation in the following step S8, and then, the captured image data (reference image data) are recorded into the memory card 30 shown in FIG. 2 in step S9. If it is decided in step S7 that a photographing instruction has not been issued, or after executing the processing in step S9, the operation returns to step S1.

As in the case of the correction target image data recorded in step S5, a file name is assigned and tag information is attached to the reference image data recorded into the memory card 30 in step S9. In step S9, "JPQ" is set as the extension of the file name and tag information indicating that the photographing operation was executed in the foreign matter information acquisition mode is attached. It is to be noted that the extension "JPQ" indicates that the image file was photographed in the foreign matter information acquisition mode and was compressed through the JPEG method. It is also to be noted that another extension may be set as long as it is different from the extension set in step S5 and that the image may be compressed through another method. The image data do not even have to be compressed.

As explained above, the electronic camera 1 varies the file extension depending upon whether the captured image data recorded into the memory card 30 were photographed in the foreign matter information acquisition mode or the normal mode (step S5, step S9). In addition, the tag information indicating the specific photographing mode in which the photographing operation was executed is attached to the corresponding photographic image data file (step S5, step S9).

Thus, it becomes possible to distinguish the photographic image data recorded into the memory card 30 as either reference image data or correction target image data.

Figure 4:
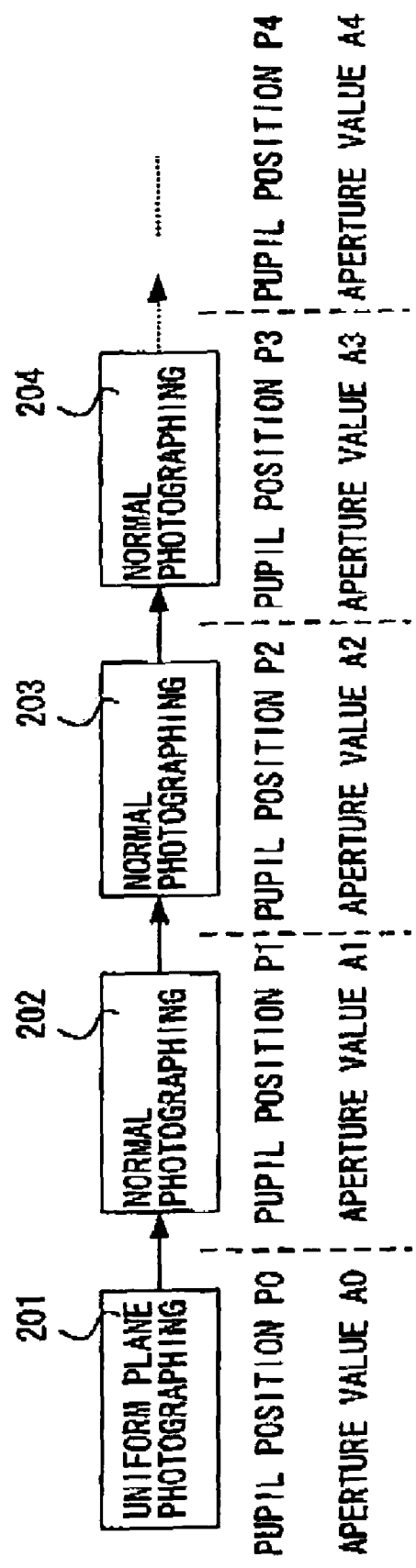
FIG. 4 shows the photographing procedure executed on the electronic camera side.

The following is an explanation of the photographing procedure which is executed to first photograph a reference image in the foreign matter information acquisition mode and then photograph a correction target image in the normal mode through the processing explained above, given in reference to FIG. 4

1) A photographing operation 201 is executed to photograph a uniform plane with the pupil position set to P0 and the aperture value set to A0, and reference image data 0 are output.
2) A normal photographing operation 202 is executed with the pupil position set to P1 and the aperture value set to A1, and correction target image data 1 are output.
3) A normal photographing operation 203 is executed with the pupil position set to P2 and the aperture value set to A2, and correction target image data 2 are output.
4) A normal photographing operation 204 is executed with the pupil position set to P3 and the aperture value set to A3, and correction target image data 3 are output. Namely, a photographing operation of the uniform plane is executed (uniform plane photographing) by turning the electronic camera 1 toward the sky or a wall surface, and then a photographing operation is executed as desired by turning the electronic camera 1 toward a subject to be photographed (normal photographing). It is to be noted that a correction target image that is an image photographed in the normal mode may be instead referred to as a normal image, a photographic image or a viewing image.

During this procedure, the aperture value is set to A0 so as to photograph a reference image with the aperture in the most constricted state within the range over which the aperture value can be adjusted at the variable optical system 3. The aperture value corresponding to the most constricted state may be, for instance, approximately F22 in the case of a standard lens. A correction target image, on the other hand, is photographed by setting the aperture value equal to that for the reference image or to a value further toward the open side.

The uniform plane photographing operation does not need to be executed repeatedly as long as the state of the foreign matter adhered to the optical component remains unchanged. While it is more desirable to execute the uniform plane photographing operation as often as possible, even foreign matter data obtained once a day prove useful under normal circumstances. It is up to the photographer to decide when to execute the uniform plane photographing operation. However, if a significant length of time has elapsed since the previous uniform photographing operation, the reference data obtained through the previous uniform plane photographing operation may not be reliable enough. Accordingly, the reference image data obtained through uniform plane photographing operation may be used only if the time interval between the uniform plane photographed in operation and the ensuing normal photographing operation is within a specific limit. In addition, the uniform plane photographing operation does not need to precede a normal photographing operation. Reference image data obtained through a uniform plane photographing operation executed after a normal photographing operation may be used. If a plurality of uniform plane photographing operations have been executed before and after the normal photographing operation, the reference image data obtained through the uniform plane photographing operation executed at a time closest to the normal photographing operation maybe used. If, on the other hand, the user is concerned with the possibility of new foreign matter having become adhered to an optical component, reference image data selected from the two sets of reference image data corresponding to the two uniform plane photographing operations closest in time to the normal photographing operation may be used.

(Operation Executed on the Image Processing Apparatus Side)

Figure 5:
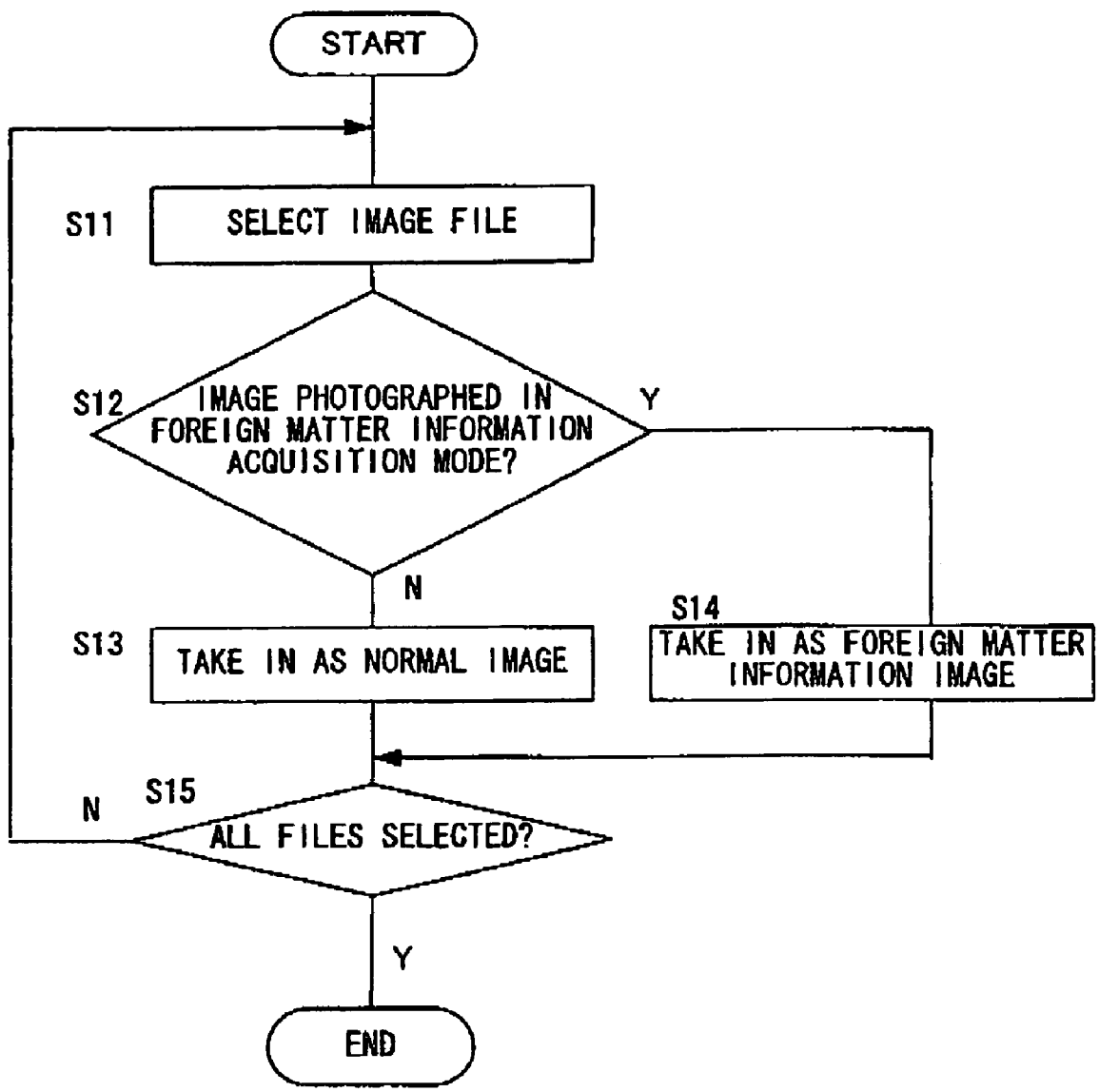
FIG. 5 shows a flowchart of the processing executed at the PC when taking in image data.

The PC 31, which functions as the image processing apparatus, takes in the reference image data and the correction target image data described above via the memory card 30 and executes processing for eliminating the undesirable effect of the foreign matter. When taking in image data, the PC 31 distinguishes reference image data from correction target image data so as to be able to automatically select data having been identified as the reference image data to be used in the foreign matter effect elimination processing. FIG. 5 presents a flowchart of the processing executed at the PC 31 when taking into image data from the memory card 30. In step S11, one of the image files recorded in the memory card 30 is selected.

In the following step S12, a decision is made as to whether or not the image file selected in step S11 contains reference image data. This decision is made by checking the extension set in step S5 or S9 in FIG. 3. Alternatively, the decision may be made by using the tag information attached in step S5 or S9. If the extension "JPG" is set or if the tag information indicating that the image was photographed in the normal mode is attached to the image file, it is judged that the image file does not contain reference image data, i.e., that the image file contains correction target image data, and the operation proceeds to step S13. If, on the other hand, the extension "JPQ" is set or the tag information indicating that the image was photographed in the foreign matter information acquisition mode is attached to the image file, it is decided that the image file contains reference image data and the operation proceeds to step S14.

In step S13, the image file having been determined in step S12 to contain a correction target image is taken in from the memory card 30 and is stored into a memory or a hard disk. This image file is handled as a foreign matter effect elimination target during the foreign matter effect elimination processing to be detailed later.

In step S14, the image file having been determined in step S12 to contain reference image data is taken in from the memory card 30 and is stored into the memory or the hard disk. At this time, the image file is stored at a location different from the memory area into which the correction target image file is stored in step S13 and with a different directory address. This image file is used later to obtain a transmittance map when eliminating the undesirable effect of the foreign matter, as detailed below.

After executing the processing in step S13 or S14, a decision is made in step S15 as to whether or not all the image files stored in the memory card 30 have been selected. If there are image files that have not been selected yet, the operation returns to step S11 to select one of the files that have not been taken in yet. The processing in step S11 to step S15 described above is repeatedly executed until all the image files are taken in.

As described above, when taking reference image data and correction target image data into the PC 31, each image file is determined to contain reference image data or correction target image data based upon the file extension or the tag information (step S12), and reference image data and correction target image data are stored into memory areas and directory locations different from each other (step S13, step S14). Thus, reference image data can be automatically selected to be used in the foreign matter effect elimination processing explained below without necessitating a user image selection.

It is to be noted that while the image data being taken into the PC 31 are distinguished as either reference image data or correction target data and are stored into a specific location in correspondence to the data type in the explanation given above, the present invention is not limited to this example. For instance, all the image data taken into the PC 31 may be stored at the same location and reference image data may be selected from the image data having been taken into the PC 31 by checking the file extensions and the tag information as necessary.

Processing is executed as explained below to eliminate the undesirable effect of foreign matter from the correction target image data by using the reference image data and the correction target image data having been taken in as described above. It is to be noted that if a plurality of sets of reference image data have been taken in, the reference image data most suitable for different sets of correction target image data are individually selected in compliance with the selection criteria explained earlier, i.e., based upon file generation dates/times recorded in the tag information attached to the files.

Figure 6:
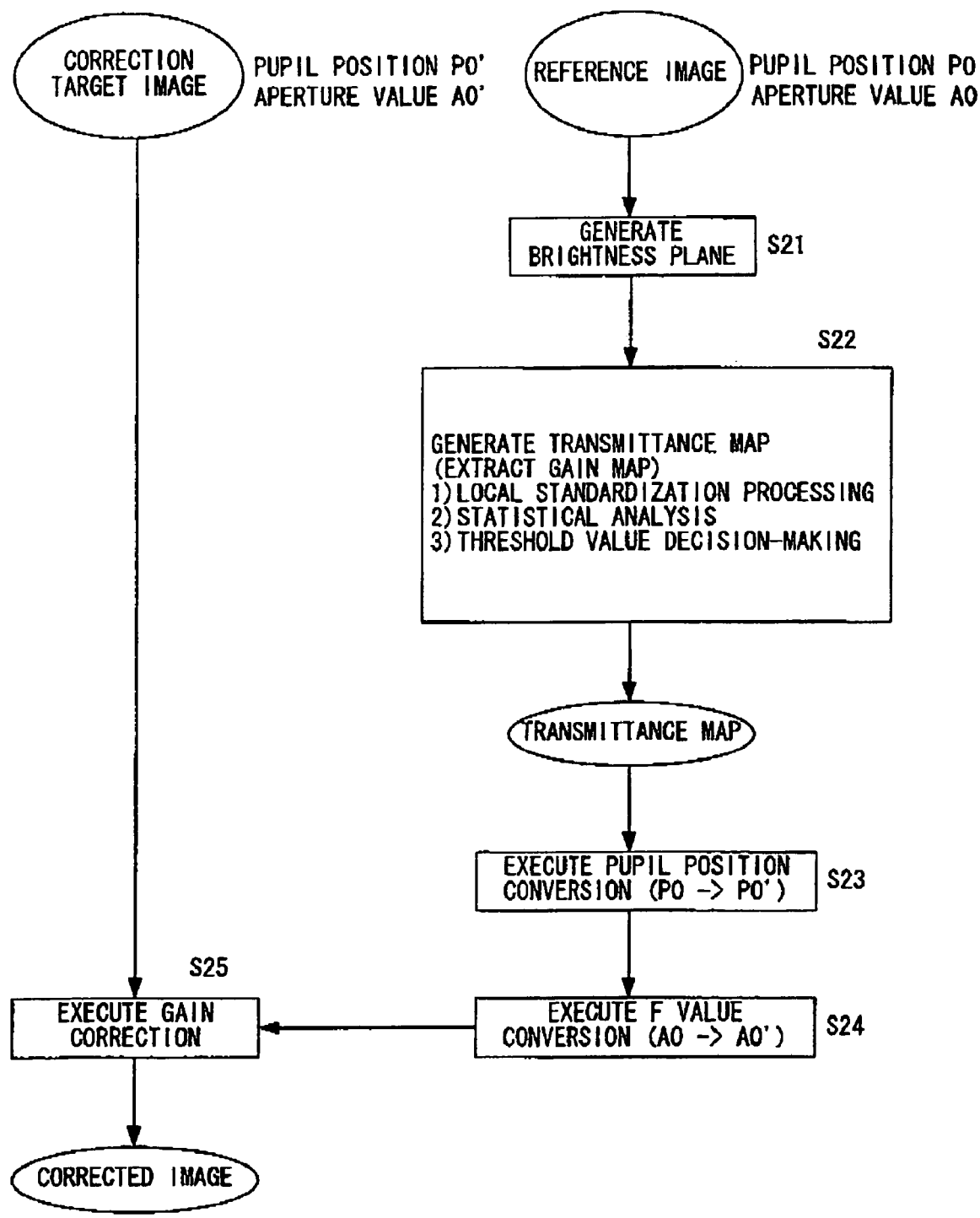
FIG. 6 shows a flowchart of the processing executed at the PC to eliminate the undesirable effect of foreign matter.

It is to be noted that the following explanation is given by assuming that each set of reference image data or correction target image data input to the PC 31 functioning as the image processing apparatus include embedded data which enable the identification of the pupil position and the aperture value. The pupil position data may be obtained through a calculation executed based upon recorded data embedded in the photographic data and indicating the lens type, the zoom position and the focal point position by using a conversion table. FIG. 6 presents a flowchart of the processing executed by the PC 31.

(Processing on Reference Image Data)

1) Generation of Brightness Plane

In step S21 in FIG. 6, a brightness or luminance plane is generated. A brightness signal is generated from the R, G and B signals in correspondence to each pixel [i,j] constituting the reference image data by using the following expression (1). [i,j] indicates the position of the specific pixel.

$$Y[i,j]=(R[i,j]+2*G[i,j]+B[i,j])/4 \quad (1)$$

Although an analysis can be executed in correspondence to the R, G and B planes individually, the effect of a foreign matter shadow basically manifests simply as a signal attenuation regardless of the color component. Accordingly, the color component signals are converted to a brightness component with which the effect of random noise can be lowered by making the most of all the available information. This also speeds up the processing since only a single plane representing the brightness component, instead of the three planes corresponding to R, G and B, needs to be analyzed. The RGB ratio for the brightness component generation does not need to be that used in the expression above, and instead, it may be set to; R:G:B:=0.3:0.6:0.1, for instance.

2) Transmittance Map Generation (Gain Map Extraction)

In step S22, a transmittance map is generated (a gain map is extracted) by executing the following processing.

2-1) Local Standardization Processing (Gain Extraction Processing)

The reference image data may not be necessarily completely uniform, as explained earlier. For this reason, the brightness plane that has been generated may not be completely uniform either. A transmittance signal T[i,j] is calculated with the following expression (2) for each pixel by executing standardization (or normalization) processing to locally standardize each pixel value on such a brightness plane. Namely, the relative ratio of the value corresponding to each target pixel [i,j] and the average pixel value over a local range containing the target pixel is calculated. Through this processing, any non-uniformity attributable to the gradation, shading or the like in the uniform plane data is successfully eliminated by using an algorithm and it becomes possible to extract lowered transmittance attributable to the foreign matter shadow alone. The transmittance ascertained as described above over the entire image plane is referred to as a transmittance map (gain map). A transmittance map provides information on defects present in the reference image. It is to be noted that the term "pixel value" refers to a value indicated by a color signal (color information) corresponding to a color component or a value indicated by the brightness signal (brightness information) at each pixel. The pixel value is a value within a range of 0-255 when, for instance, expressed in 1 byte.

$$T[i,j] = \frac{Y[i,j]}{\left(\sum_{m=i-a}^{i+a}\sum_{n=j-b}^{j+b} Y[i+m, j+n]\right)/(2a+1)(2b+1)} \quad (2)$$

The range over which the local average among (2a+1)×(2b+1) pixels is calculated should be larger than the diameter of the foreign matter. Ideally, an area that is at least 3 times as large as the foreign matter shadow should be set for the range to obtain accurate transmittance data. "a" indicates the number of pixels present to the left/right of the target pixel [i,j] and b indicates the number of pixels present above/below the target pixel [i,j]. For instance, if the pixel pitch at the image-capturing element 8 is 12 μm and the distance between the image-capturing surface and the surface on which foreign matter is adhered is 1.5 mm, the diameter of the large foreign matter ranges over approximately 15 pixels with the aperture value set at F22 and ranges over approximately 40 pixels with the aperture value set at F4. Accordingly, "a" and "b" should each be set to 40 so as to set the local averaging range over 81×81 pixels. However, this is only an example and a range containing a different number of pixels may be used.

The aperture value greatly affects the seriousness of a foreign matter shadow, and while the effect of small foreign matter can be easily eliminated by opening the aperture, the effect of large foreign matter may become less noticeable but still be present over a significant area even when the aperture is adjusted to the open side. Depending upon the pixel pitch width at the image-capturing element, a round foreign matter shadow may manifest over several tens of pixels even when the aperture is adjusted toward the open side, and in such a case, the local average must be taken over a very large range to result in an increase in the length of processing time. Under such circumstances, the processing may be speeded up by calculating the local average with sub-sampled pixels.

Figure 7A:
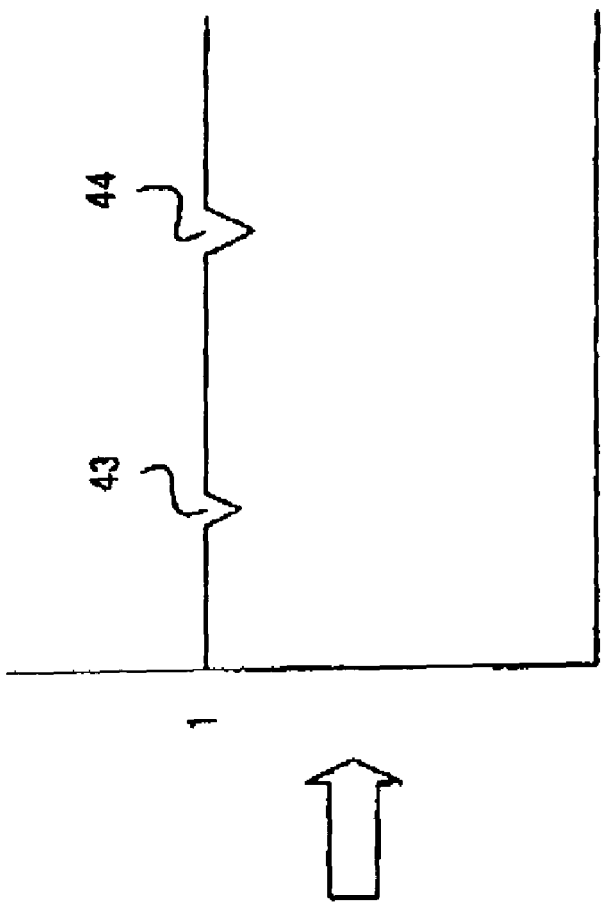
FIGS. 7A and 7B show the local standardization processing executed on the brightness plane.
Figure 7B:
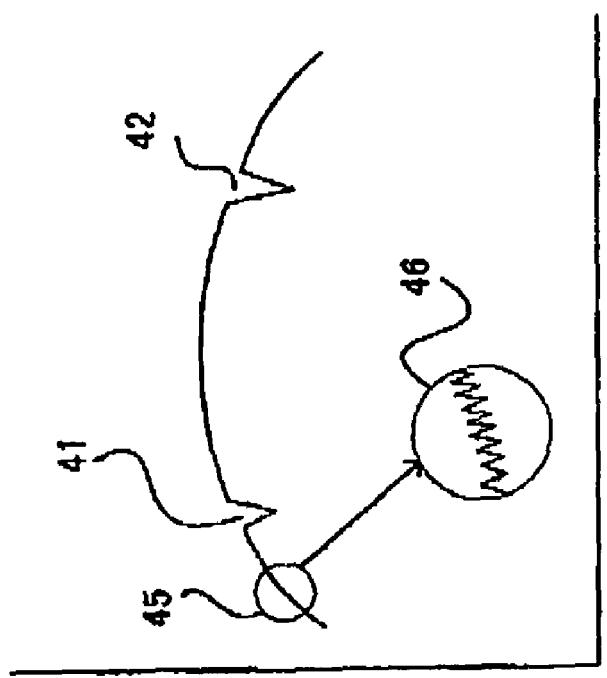

The processing for calculating the relative ratio over the (2a+1)×(2b+1) pixel range is referred to as local standardization processing (gain extraction processing). The filter used when calculating the relative ratio over the (2a+1)×(2b+1) pixel range may instead be referred to as a gain extraction kernel. FIGS. 7A and 7B illustrate the local standardization processing executed on the brightness plane. FIG. 7A shows the brightness signals at pixels ranging along the horizontal direction within the brightness plane. Reference numerals 41 and 42 each indicate an brightness signal attenuated due to the presence of foreign matter. FIG. 7B shows the results of the local standardization processing described above executed on the brightness signals in FIG. 7A. Namely, it shows the results of standardization processing executed on pixel values within the local range. Reference numerals 43 and 44, which correspond to reference numerals 41 and 42 in FIG. 7A, each indicate the transmittance at a point at which foreign matter is present. As illustrated in FIGS. 7A and 7B, any unevenness in the gradation, shading and like contained in the uniform plane data is eliminated, and only the reduction in the transmittance attributable to the foreign matter shadow can be extracted. As a result, the position of the foreign matter and the level of the transmittance can be ascertained at once.

2-2) Low Pass Processing of the Transmittance Map

While low pass processing of the transmittance map may be omitted, it is still desirable to execute the low pass processing since it proves effective in most cases. The transmittance signal T[i,j] contains random noise attributable to quantum fluctuations in the brightness signal, and for this reason, if the threshold value decision-making described in 2-4) below is executed in an area over which the transmittance levels remain close to 1 and subtle effects of a foreign matter shadow are discernible, the foreign matter shadow may be extracted in a mottled pattern due to randomness. The appearance of the image area can be somewhat improved by grouping the foreign matter shadow fragments with a low pass filter, the function of which is expressed in the following expression (3).

$$T[i, j] = \{4*T[i, j] + 2*(T[i-1, j] + T[i+1, j] + \quad (3)$$
$$T[i, j-1] + T[i, j+1]) + 1*(T[i-1, j-1] +$$
$$T[i-1, j+1] + T[i+1, j-1] + T[i+1, j+1])\}/16$$

2-3) Statistical Analysis of the Transmittance Map

A statistical analysis of the transmittance map is executed to obtain an average value m by using expression (4) and determine a standard deviation σ by using expression (5) over the entire image plane corresponding to the transmittance map obtained through the local standardization processing. It is to be noted that Nx and Ny respectively indicate the total numbers of pixels set along the x direction and the y direction.

$$m = \frac{1}{N_x N_y} \sum_{i,j} T[i, j] \quad (4)$$

$$\sigma = \sqrt{\frac{1}{N_x N_y} \sum_{i,j} (T[i, j] - m)^2} \quad (5)$$

2-4) Threshold Value Decision-Making

Figure 8:
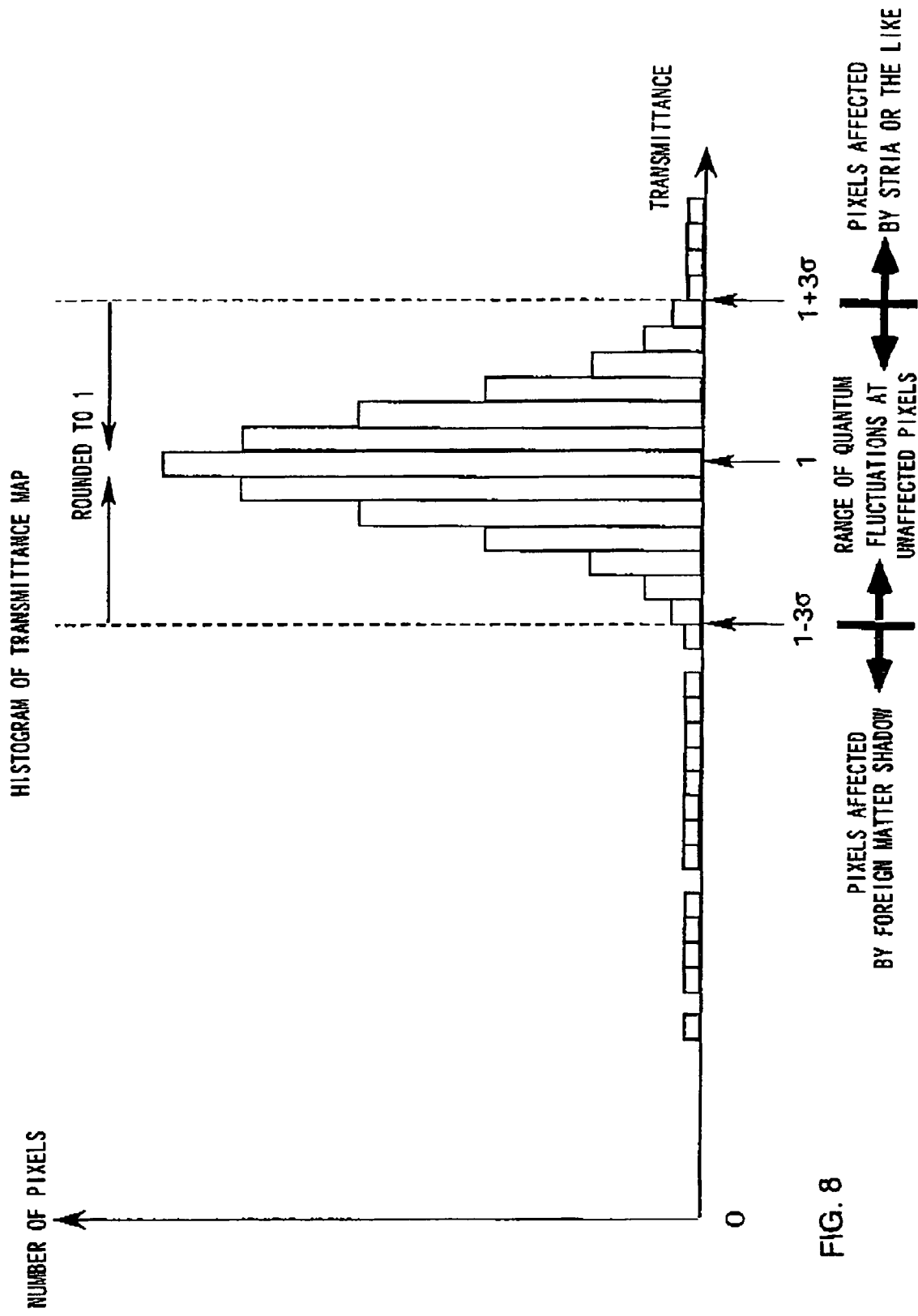
FIG. 8 shows a histogram of the transmittance map.

Basically, the areal ratio of foreign matter signals in the transmittance map is extremely small, and for this reason, the level of the random noise (shot-noise) attributable to quantum fluctuations in each transmittance signal is evaluated through the statistical analysis detailed in 2-3). The presence of such subtle random noise is indicated in an enlargement 46 of the area assigned with reference numeral 45 in FIG. 7A. A histogram of the transmittance map indicates a normal distribution with the standard deviation σ around the average value m (m is a value very close to 1). FIG. 8 shows the histogram of the transmittance map. Since the transmittance can be assumed to remain unaffected by the presence of foreign matter shadows over this fluctuation range, the transmittance can be set to 1 forcibly. In other words, the threshold value decision-making may be executed in accordance with the following conditions (6) and (7).

$$\text{if } |T[i,j]-m| \leq 3\sigma \text{ then } T[i,j]=1 \quad (6)$$

$$\text{else } T[i,j]=T[i,j] \quad (7)$$

The normally distributed random data account for 99.7% over the ±3σ range and thus, the effect of the random noise can be substantially eliminated with accuracy. Any signal indicating a transmittance outside the ±3σ range can be considered to be an abnormal signal which can hardly be explained as attributable to a statistical error and can be assumed to represent a phenomenon induced by a lowered transmittance due to the presence of a foreign matter shadow. When an abnormality is induced by foreign matter, the abnormal signal indicates a value smaller than 1 under normal circumstances.

However, some abnormal signals may indicate values larger than 1 although such an occurrence is relatively rare. This phenomenon is not attributable to a foreign matter shadow but is attributable to, for instance, an interference fringe that manifests as a defect occurring at stria (non-uniformity in the refractive index) at an optical low pass filter or the like, increases or decreases the intensity of the incident light. Thus, the method may be adopted to detect a defect in an optical member as well as to detect foreign matter present in the optical path. In addition, the method may be adopted to determine the extent of the effect of a pixel defect manifesting within the image-capturing element. While foreign matter present close to the image-capturing element 8 tends to show clearly in a photographic image, even foreign matter on the photographic lens which becomes fairly blurred in the photographic image can be identified with a high degree of accuracy.

It is to be noted that threshold value decision-making should be executed in accordance with conditions (8), (9) and (10) below in order to eliminate the effect of foreign matter shadow alone.

$$\text{if } |T[i,j]-m| \leq 3\sigma \text{ then } T[i,j]=1 \quad (8)$$

$$\text{else if } T[i,j]>1 \ T[i,j]=1 \quad (9)$$

$$\text{else } T[i,j]=T[i,j] \quad (10)$$

Since the average m used in the decision-making is always a value close to 1, it may be substituted by 1.

As explained above, two types of defect information, i.e., map information representing the position of a defective pixel (judged to be defective or defect free by deciding whether or not T=1) and transmittance information indicating the extent of the defect, are obtained at once. It is to be noted that the transmittance map, which indicates the local relative gains, may be referred to as a gain map instead.

Under normal circumstances, defects such as foreign matter are detected by using an edge detection differential filter. However, the contrast between the shadows of foreign matter present in the optical path which become optically blurred, and their surroundings is extremely low. In such a case, the differential filter, the sensitivity level of which is very low, can hardly detect any foreign matter. Instead, the statistical characteristics of the transmittance may be used in the decision-making processing as described above to detect foreign matter with an extremely high level of sensitivity, and as a result, it becomes possible to correct the undesirable effect of foreign matter present in the optical path thereby achieving the object of the present invention.

3) Pupil Position Conversion of the Transmittance Map

In step S23, the transmittance map is converted correspondingly to the pupil position. The pupil position conversion is executed when the pupil position set to photograph the reference image and the pupil position set to photograph the correction target image are different from each other to convert a foreign matter position in the reference image to a foreign matter position at which the foreign matter is predicted to appear as it is viewed from the pupil position of the correction target image. FIGS. 9A and 9B show how the position of the foreign matter shadow changes as the pupil position changes. FIG. 9A shows the relationship among the pupil position, the foreign matter and the image-capturing surface of the image-capturing element 8. FIG. 9B shows how the foreign matter shadow moves on the image-capturing surface as the pupil position changes.

As FIGS. 9A and 9B clearly indicate, the position of the foreign matter appearing within the image becomes offset along the radius vector from an optical axis 51, i.e., the image center, as the pupil position changes. Bearing this in mind, an offset quantity Δr by which the foreign matter present at a position distance from the optical axis 51 within the image by r becomes offset along the radius vector is estimated. When the P0 represents the pupil position set for the reference image, P0' represents the pupil position set for the correction target image and the foreign matter is adhered at a position distanced from the image-capturing surface by 1, Δr be calculated by using expression (11) presented below.

$$\Delta r = r \cdot \frac{l}{P_0' - l} \cdot \frac{P_0 - P_0'}{P_0} \tag{11}$$

It is to be noted that the distance 1 is a value obtained by converting the thickness of the optical component to the optical path length in the air.

The transmittance map T[i,j] of the reference image is displaced to [r', θ] on polar coordinates [r, θ] by using the following expression (12) and thus, is converted to a transmittance map T'[i,j] on coordinates [i,j].

$$r' = r + \Delta r = r\left(1 + \frac{l}{P_0' - l} \cdot \frac{P_0 - P_0'}{P_0}\right) \tag{12}$$

The offset quantity Δr increases as the distance from the optical axis 51 increases. At the peripheral area of an actual image, the offset quantity may be equivalent to several tens of pixels, depending upon the value set for the pupil position.

4) F Value Conversion of the Transmittance Map

Figure 10A:
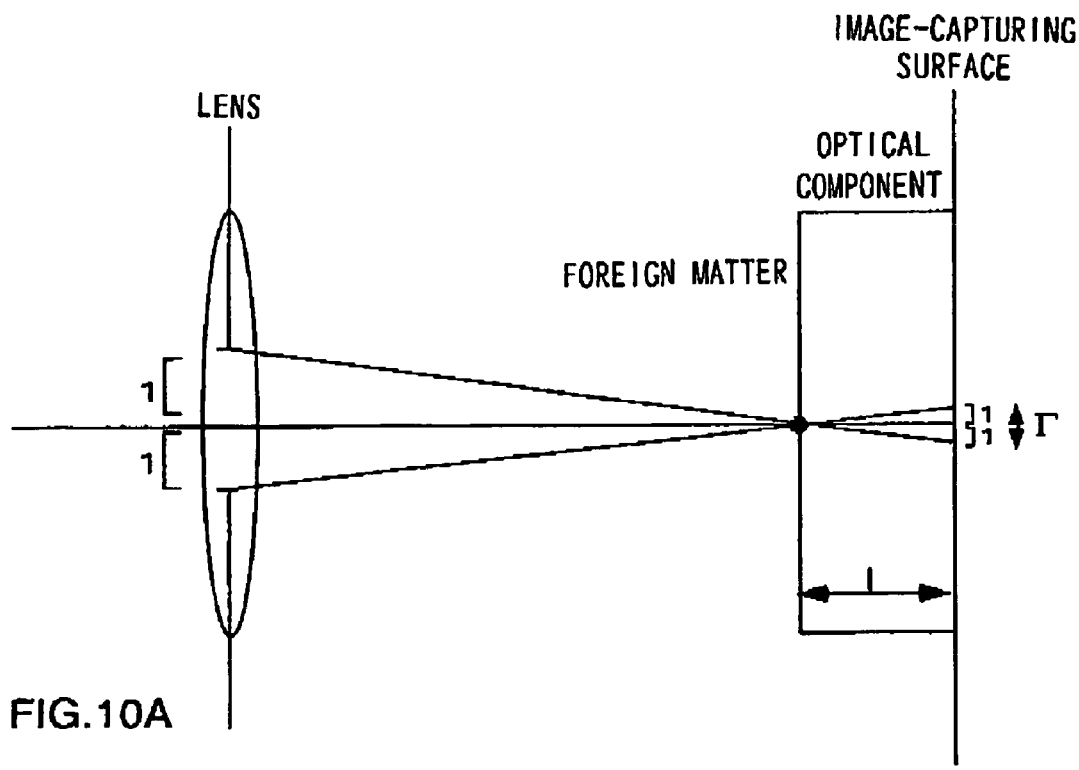
FIGS. 10A and 10B show the change in the size of the foreign matter shadow occurring as the aperture value, i.e., the F value, changes.
Figure 10B:
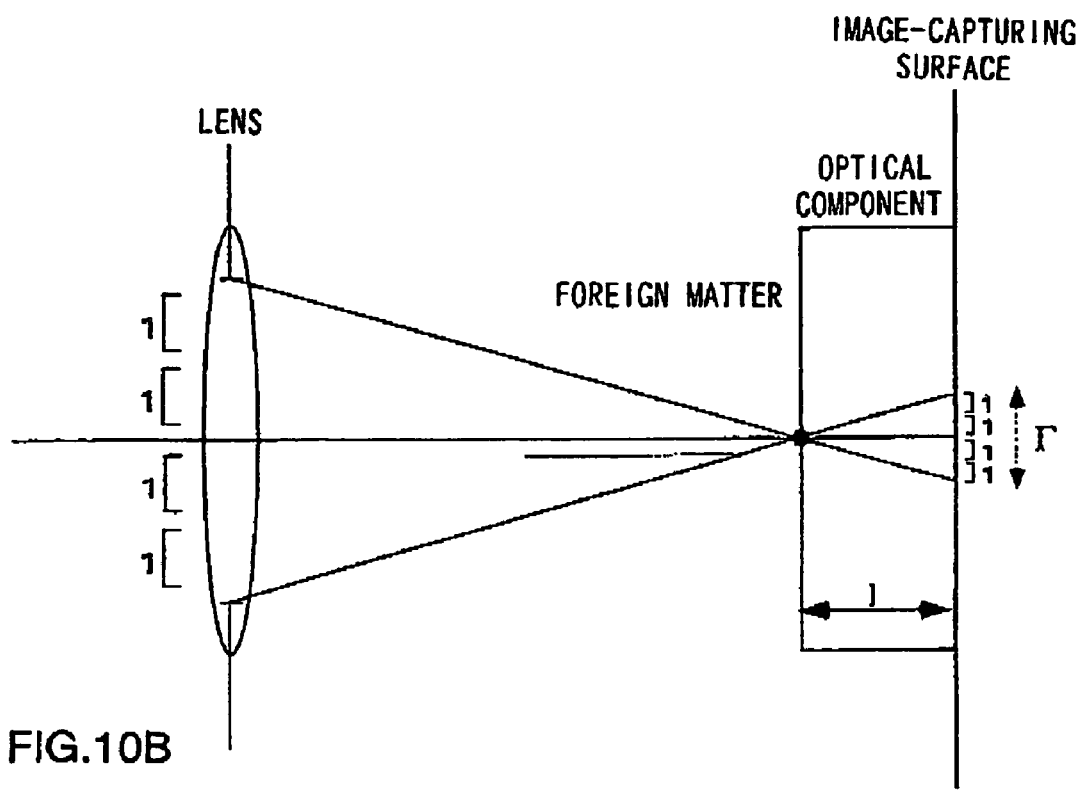

In step S24, the transmittance map undergoes an F value conversion. Namely, if the aperture value set to capture the reference image and the aperture value set to capture the correction target image are different from each other, the foreign matter diameter and the corresponding transmittance in the reference image undergo an F value conversion to be converted to a foreign matter diameter and a transmittance corresponding to the aperture value set further toward the open side to capture the correction target image. FIGS. 10A and 10B show how the size of a foreign matter shadow changes as the F value representing the aperture value changes FIG. 10A shows the foreign matter shadow at a large F value setting, whereas FIG. 10B shows the foreign matter shadow at a small F value setting. As FIGS. 10A and 10B clearly indicate, the correlation between the distance 1 from the image-capturing surface to the foreign matter position and the foreign matter size Γ can be expressed as in (13) below by incorporating the defining expression of the F value (F=focal length/lens effective aperture).

$$\Gamma = \frac{l}{F} \tag{13}$$

The foreign matter diameter can be expressed as a number of pixels by dividing 1 by the pixel pitch a (mm/pixel) at the image-capturing element. Thus, the foreign matter as a point image is estimated to spread over the width Γ when the aperture is set at F.

At the same time, since the foreign matter shadow is considered to be enlarged as light is uniformly irradiated on the foreign matter forming the point image from the individual angles of incidence at the lens opened to the aperture value, the distribution function of the point image can be assumed to be a function with a completely homogeneous spread. Accordingly, by executing homogeneous low pass filter processing expressed with a number of pixels corresponding to the filter width Γ, an F value conversion with which the foreign matter diameter and the transmittance can be predicted with a high degree of accuracy is enabled. While the low pass filter used in this application is normally a non-separation type filter formed in a circular shape having a diameter Γ, a separation type filter formed in a square shape having longitudinal and lateral sides set to Γ may instead be used to speed up the processing.

Let us now consider an example in which 1=0.5 mm, a=5 μm/pixels and a transmittance map corresponding to the aperture value F22 is converted to transmittance maps corresponding to F16, F11, F8, F5.6 and F4. The one-dimensional filter coefficients of the square separation type filter can be set as indicated in FIG. 11. The low pass filter processing is executed both along the vertical direction and along the horizontal direction by using the one-dimensional filter coefficients indicated in FIG. 11. It is to be noted that the one-dimensional filter coefficients corresponding to the aperture F16 include a total of seven coefficients with the coefficient 0.5 set at both ends, so as to filter a shadow spread over a width represented by an even number over a range that expands uniformly along the horizontal direction and the vertical direction with a width represented by an odd number around the target pixel. FIG. 12 shows the aperture F16 filter represented as a two-dimensional filter.

Through the conversion processing described above, the transmittance map of the reference image is converted to the transmittance map corresponding to the pupil position and the F value set to capture the correction target image. In other words, the transmittance map of the reference image is converted to a transmittance map equivalent to a transmittance map that would generated under the optical conditions with which the correction target image was photographed.

(Processing on the Correction Target Image)

(5) Gain Correction

In step S25 in FIG. 6, a gain correction is executed by using the transmittance map obtained through the conversion processing explained above. The gain correction is executed by multiplying the R, G and B values in the correction target image data with the reciprocal of the value indicated by the transmittance signal having undergone the pupil position/F value conversion, as indicated in expressions (14), (15) and (16) respectively.

$$R[i,j]=R[i,j]/T'[i,j] \quad (14)$$

$$G[i,j]=G[i,j]/T'[i,j] \quad (15)$$

$$B[i,j]=B[i,j]/T'[i,j] \quad (16)$$

Figure 13:
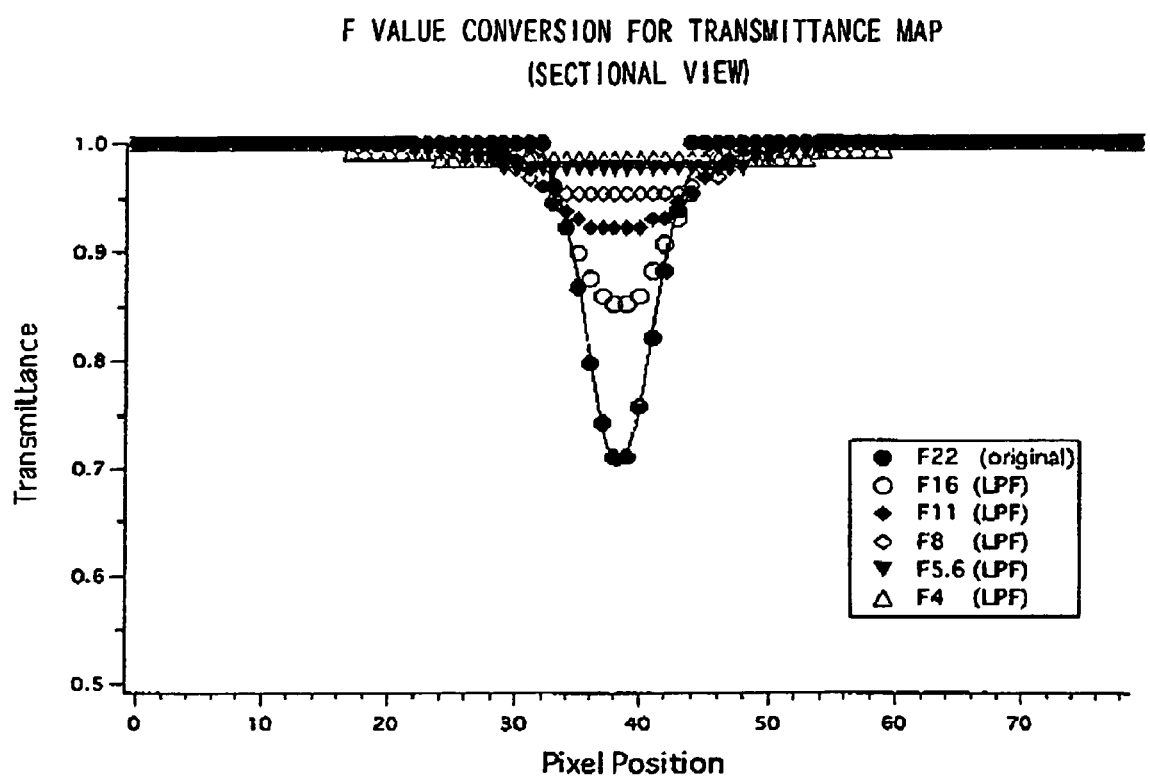
FIG. 13 shows the F value conversion executed to convert the transmittance over an area where foreign matter of medium-size is present.

FIG. 13 shows how the transmittance is converted through the F value conversion over an area where foreign matter of medium size is present. The pixel position is indicated along the horizontal axis, and the transmittance is indicated along the vertical axis.

As described above, once a reference image is photographed with the aperture value set to the smallest value in a variable optical system, another reference image does not need to be photographed under different optical conditions. Namely, by converting the foreign matter data in the single reference image, an effective correction can be achieved. As a result, the onus placed on the user of the electronic camera is greatly reduced. In addition, a very high level of sensitivity in the foreign matter detection performance can be maintained without having to photograph a completely uniform image.

In the electronic camera 1 described above, the extension and the tag information stored in the memory card 30 together with a reference image data file are different from those stored in the memory card 30 together with a correction target image data file. Thus, when the image processing apparatus executes the processing for eliminating the foreign matter effect by taking in a data file, reference image data are automatically selected without requiring a user data file selection.

It is to be noted that data files of reference image data and correction target image data appended with extensions and tag information contents different from each other are stored in the memory card 30 and the data files are then taken into the PC 31 via the memory card 30 in the embodiment described above. Instead, such data files containing reference image data and correction target image data may be taken into the PC 31 via the external interfaces 23.

In addition, a transmittance map is generated by executing the local standardization processing and the like on a reference image of a supposedly substantially uniform plane photographed by the photographer in the embodiment. However, there may be in a small pattern or the like present in the reference image considered to be substantially uniform by the photographer. This problem can be basically solved by. photographing the subject in an unfocused state. For instance, the photographer may photograph the subject by positioning it at a position closer than the shortest photographing distance of the lens. As long as the small pattern is photographed as an unfocused image that changes gently over a larger range than the range of the gain extraction kernel corresponding to (2a+1)×)2b+1) pixels, a reference image which is uniform enough to fulfill the purpose can be obtained.

While the image-capturing element in the embodiment adopts a Bayer array R, G and B colorimetric system, it goes without saying that no restrictions whatsoever are imposed with regard to the arrangement of the color filters as long as the required interpolation processing can be executed. Furthermore, the image-capturing element may adopt a different colorimetric system (such as the complementary colorimetric system).

Moreover, while an explanation is given above in reference to the embodiment on an example in which the present invention is adopted in a single lens reflex electronic still camera in which interchangeable lenses are used, the present invention is not limited to this example. The present invention may be adopted, for instance, in a camera that does not allow the use of interchangeable lenses. The pupil position and the aperture value can be ascertained by using an appropriate method in the known art.

In addition, while image data obtained by photographing images with the electronic still camera 1 are processed in the embodiment explained above, the present invention is not limited to this example. The present invention may be adopted to process image data photographed with a video camera which handles dynamic images as well. It can also be adopted to process image data photographed with a portable telephone equipped with a camera. The present invention may be further adopted in conjunction with photocopiers, scanners and the like. In other words, the present invention may be adopted to process all types of image data obtained by capturing images with an image-capturing element.

While an explanation is given above in reference to the embodiment on an example in which the effect of foreign matter is eliminated at the PC (personal computer) 31 by processing image data photographed with the electronic camera 1, the present invention is not limited to this example. A program enabling such processing may be installed in the electronic camera 1. The program may instead be installed in a printer, a projection apparatus or the like. In other words, the present invention may be adopted in all types of the apparatuses that handle image data.

Figure 14:
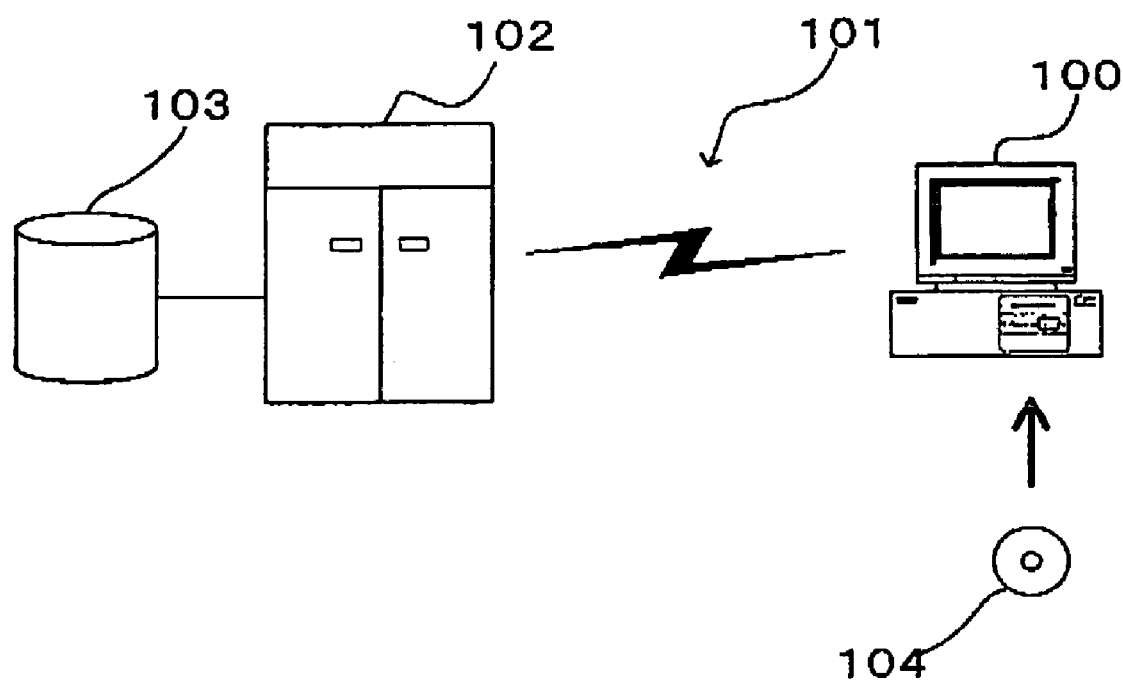

The program executed by the PC 31 may be provided in a recording medium such as a CD ROM or through a data signal on the Internet or the like. FIG. 14 shows how the program may be provided in those forms. The program is provided to the PC 31 via the CD ROM 34. In addition, the PC 31 can be connected with a communication line 101. A computer 102 is a server computer that provides the program stored in a recording medium such as a hard disk 103. The communication line 101 maybe a communication line for Internet communication, personal computer communication or the like, or it may be a dedicated communication line. The computer 102 reads out the program from the hard disk 103 and transmits the program to the PC 31 via the he communication line 101. Thus, the program can be distributed as a computer-readable computer program product adopting any of various modes such as a recording medium.

The above described embodiments are examples, and various modifications can be made without departing from the spirit and scope of the invention.

What is claimed is:

1. An image-capturing apparatus, comprising:
    a mode setting unit that sets a normal image acquisition mode and a reference image acquisition mode;
    an image-capturing unit that captures an image of a subject through an optical system; and
    a control unit that generates an image data file containing a normal image when the normal image acquisition mode is selected and generates an image data file containing a reference image to be used to correct an image defect in the normal image when the reference image acquisition mode is selected, wherein:
        the image data files containing the normal image and the reference image are each constituted of image data corresponding to pixels in the image and information related to the image;
        the control unit records the image data file containing the normal image and the image data file containing the reference image into a recording medium in a format that allows the image data file containing the normal image to be distinguished from the image data file containing the reference image;

outside the image-capturing apparatus a correction unit that automatically selects, without requiring a user data file selection, the image data file containing the reference image for use in correcting the image defect in the image data file containing the normal image based upon distinguishing the recorded format; and the recorded format used to distinguish the image data files being either:
  (1) an extension appended to the image data file containing the reference image and an extension appended to the image data file containing the normal image; or
  (2) the information related to the image contained within the image data file containing the reference image and the information related to the image contained within the image data file containing the normal image.

2. An image processing apparatus, comprising:

an input unit that inputs the image data file from the recording medium in which the image data file was recorded at the image-capturing apparatus according to claim 1;

an identifying unit that identifies the image data file as a file containing the reference image or a file containing the normal image; and the correction unit.

3. A computer-readable program product comprising a control program that executes a function of the image processing apparatus according to claim 2.

4. An image-capturing apparatus comprising:

an image-capturing unit that captures a subject image input through an optical system;

a mode switching unit that selects a first mode in which a reference image is captured by the image-capturing unit or a second mode in which a normal image is captured by the image-capturing unit, the reference image being used to correct an image defect in the normal image;

an output unit that generates an image data file containing the reference image and an image data file containing the normal image, and outputs the image data file containing the reference image and the image data file containing the normal image to an external apparatus so that the image defect in the normal image can be corrected at the external apparatus; and an information appending unit that appends information to the image data file indicating whether an image data file output by the output unit contains the reference image or the normal image, wherein the external apparatus includes an elimination unit that automatically selects, without requiring a user data file selection, the image data file containing the reference image for use in correcting the image defect in the image data file containing the normal image based upon distinguishing the appended information.

5. An image-capturing apparatus according to claim 4, wherein:

the information appending unit appends metadata containing information indicating either the reference image or the normal image to the image data file; and the metadata does not alter the reference image or the normal image contained in the image data file.

6. An image-capturing apparatus according to claim 4, wherein:

the information appending unit appends the information indicating whether the image data file contains the reference image or the normal image to the image data file by partially modifying a file name assigned to the image data file.

7. An image-capturing apparatus according to claim 4, wherein:

the output unit records the image data file containing the reference image and the image data file containing the normal image into a removable recording medium from which the image data file containing the reference image and the image data file containing the normal image are read at the external apparatus so that the image defect in the normal image can be corrected at the external apparatus.

8. An image processing apparatus, comprising:

an input unit to which the image data file output from the image-capturing apparatus according to claim 5 is input;

an identifying unit that identifies the image data file as a file containing the reference image or a file containing the normal image based upon the information; and the elimination unit that eliminates an effect of foreign matter present on an image-capturing optical path at the image-capturing unit from the normal image based upon the selected reference image.

* * * * *